United States Patent [19]

Dukess

[11] 4,334,522
[45] * Jun. 15, 1982

[54] SOLAR HEAT APPARATUS

[76] Inventor: Joseph Dukess, 931 Greacen Point Rd., Mamaroneck, N.Y. 10543

[*] Notice: The portion of the term of this patent subsequent to Sep. 4, 1996, has been disclaimed.

[21] Appl. No.: 66,751

[22] Filed: Aug. 15, 1979

Related U.S. Application Data

[63] Continuation-in-part of Ser. No. 794,448, May 6, 1977, Pat. No. 4,166,769.

[51] Int. Cl.³ ................................................ F24J 3/02
[52] U.S. Cl. ..................................... 126/440; 126/418
[58] Field of Search ............... 126/422, 440, 439, 426, 126/418

[56]  References Cited
U.S. PATENT DOCUMENTS 3,351,536 11/1967 Fox ................................. 202/234
4,043,315 8/1977 Cooper ........................... 126/440
4,056,093 11/1977 Barger ............................ 126/440
4,057,048 11/1977 Maine ............................. 126/441
4,166,769 9/1979 Dukess ........................... 126/440

Primary Examiner—Samuel Scott
Assistant Examiner—G. Anderson
Attorney, Agent, or Firm—Alan H. Levine

[57] ABSTRACT

A solar energy device comprising a member adapted to contain a liquid and a lens for concentrating rays from the sun on a surface of the member. Cold liquid enters the member and heated liquid is extracted from it. A device produces relative movement between the lens and member surface in response to variations in temperature of the liquid in the member so as to move the member surface into and out of coincidence with the focal point of the lens. The device producing movement may include an element which expands and contracts in response to temperature variations.

10 Claims, 8 Drawing Figures

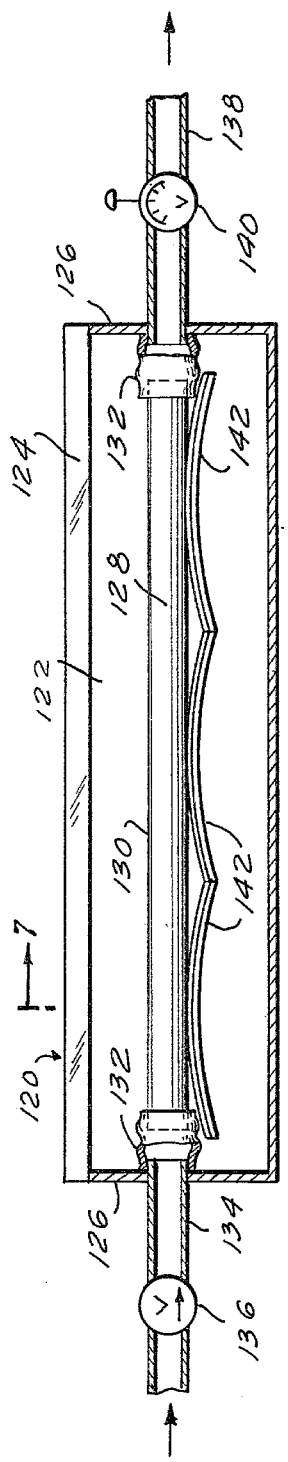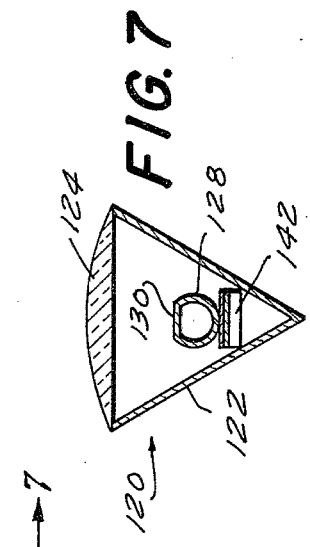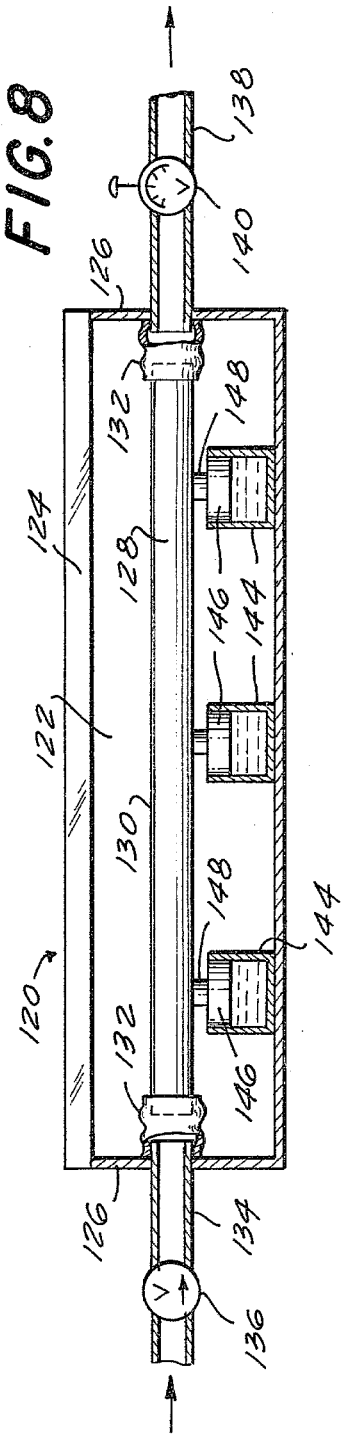

SOLAR HEAT APPARATUS

This application is a continuation-in-part of copending application Ser. No. 794,448, filed May 6, 1977, now U.S. Pat. No. 4,166,769.

The present invention relates to a solar energy device, and more particularly to an apparatus for collecting the radiant energy of the sun through direct and reflected rays therefrom.

In the past various arrangements of lenses have been used to concentrate the rays of the sun for the purpose of extracting solar energy.

In U.S. Pat. No. 3,934,573 there is disclosed the use of a spherical system for directing the sun's rays through lenses onto a boiler. However, the heat from such rigidly mounted lenses focused on a rigid boiler requires the use of expensive materials for use in the boiler and eliminates the possibility of using low cost materials in the production of solar energy. No means are provided for moving the boiler skin slightly out of focus upon an increase in temperature above a predetermined level.

The expansion of fluids through application of solar radiation is old in the art as shown in U.S. Pat. No. 3,436,908 but such patent does not conceive a relatively movable lens and container for heating fluids. Likewise, U.S. Pat. No. 3,908,631 which is directed to apparatus for converting solar radiation to thermal energy by heating a gaseous stream of air does not utilize a relatively movable lens and container for minimizing cost and production difficulties of the solar energy apparatus.

It is the object of this invention to provide a low cost solar energy device capable of being manufactured out of inexpensive materials, which can be used for individual installations in homes, factories, and offices to provide heat and energy, yet which may be made of materials of lower melting temperatures thereby facilitating manufacturing processes.

The concept of the invention is to provide a solar energy device in the form of a body having at least one focusing lens thereon for concentrating direct and/or reflected rays of the sun on the surface of a liquid-containing member disposed in the body and which may contain a black heat absorbent core. Means are provided for relatively moving the member surface and lens toward and away from each other in response to changes in temperature of the liquid in the member. For example, either the body or the member is expansible and contractible so as to direct the lenses into focus on the surface of the member until a predetermined temperature is reached whereby the member will expand so its surface is out of the focal point to lessen concentrated heat thereon. Thereafter contraction will return the focal point to the surface of the member and heating continues at the optimum rate. Alternatively, the body and member may be rigid, and a device located within the body which expands and contracts in response to temperature variations and thereby produces relative movement between the lens and member. The solar energy device is made of easily worked materials including plastics and metals and is adapted for home use for heating, power, and desalinization.

The alternating expansion and contraction of the member or body, or movement of the lens or member, can be harnessed to perform useful work.

FIG. 6 is a longitudinal cross-sectional view of a further embodiment of the invention, wherein a separate device produces movement between the member and body;

FIG. 7 is transverse cross-sectional view taken on line 7—7 of FIG. 6; and

FIG. 8 is a view similar to FIG. 6 of still another embodiment of the invention.

Figure 1:
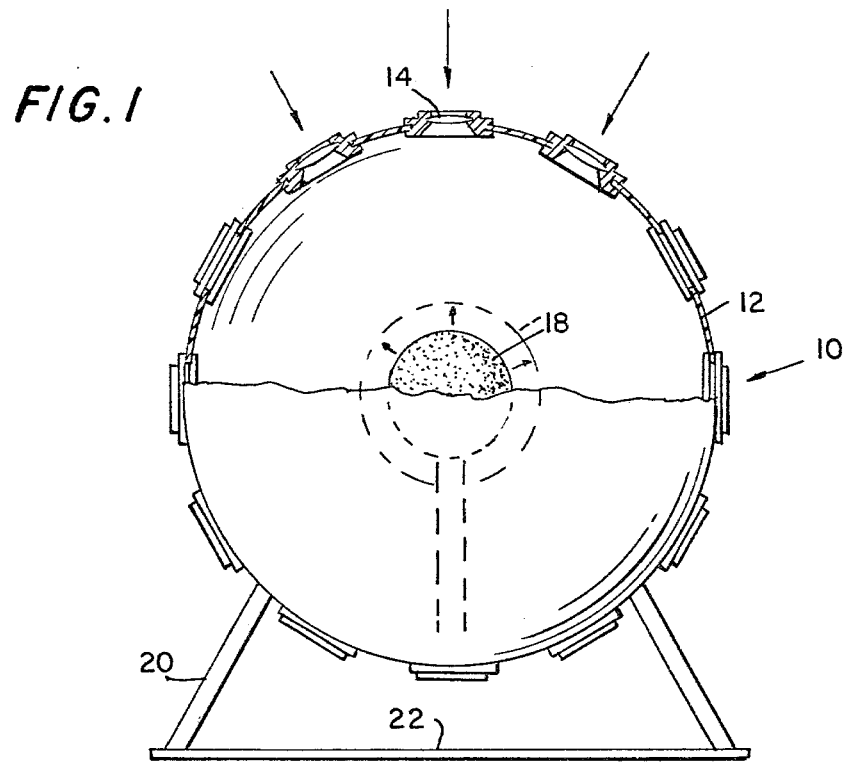
FIG. 1 is a schematic view of one embodiment of the invention employing a rigid outer body and a flexible inner member.
Figure 3:
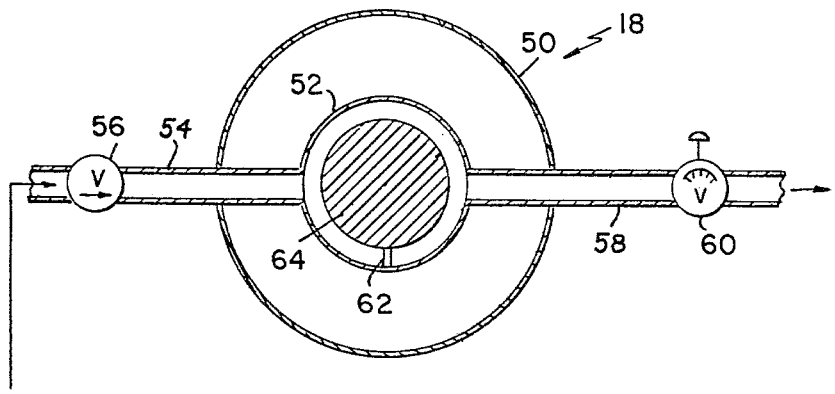
FIG. 3 is a sectional schematic view illustrating in greater detail the flexible inner member.
Figure 4:
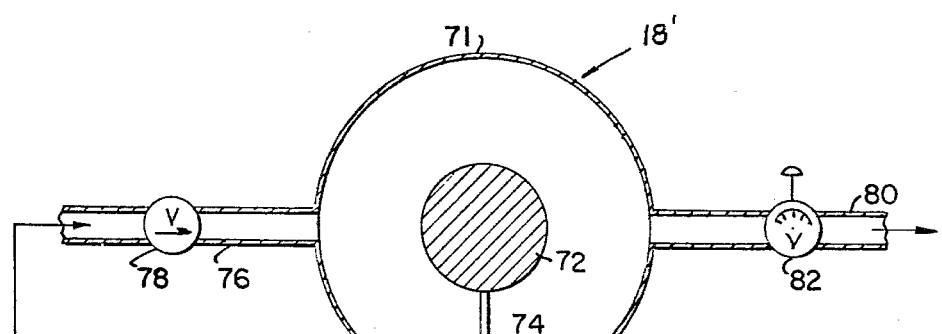
FIG. 4 is a sectional schematic view showing a modified form of the heating member.
Figure 5:
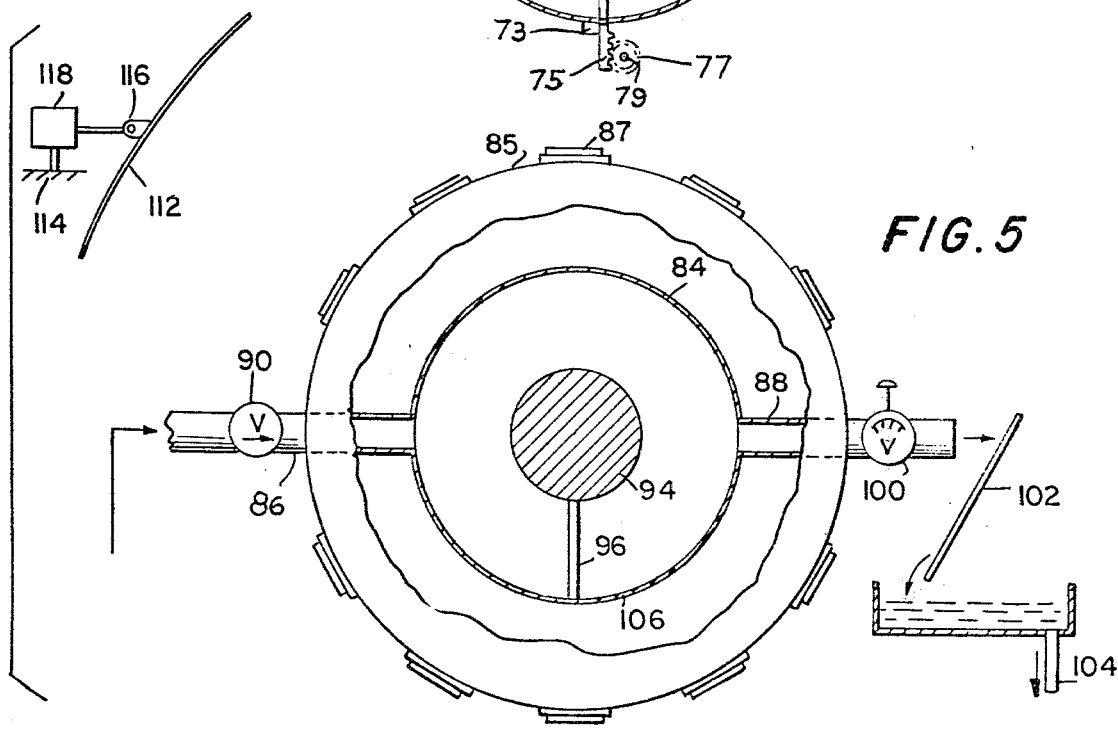
FIG. 5 is a schematic illustration of a desalinization plant in accordance with the concepts of the invention.

With reference to the accompanying drawings, wherein like reference numerals designate similar parts throughout the various views, FIG. 1 shows an embodiment of a solar heating device 10 according to the present invention. In this embodiment, a rigid spherical body 12 of plastic or metal is provided with a plurality of lenses 14 for focusing both direct and reflected rays from the sun. The body 12 may be transparent. The lenses 14 are disposed about the entire surface of body 12. The lenses and/or the entire inner surface of body 12 may be coated with a reflecting film. Within the spherical body 12 is an expansible and contractible member 18, the details of the construction of which are shown in FIGS. 3 through 5. The spherical body 12 is supported by stanchions or suitable supports 20 above a mirror or other reflecting surface 22.

The heating member 18 may be in the form shown in FIG. 3. Herein the member 18 includes an expansible and contractible sphere 50 having therein a rigid boiler 52 connected to intake conduit 54 provided with a one way valve 56 and a discharge conduit 58 with a pressure gage 60. The space between the member sphere 50 and the boiler 52 is filled with a fluid, preferably a gas. Inside the boiler 52 there is supported at 62 a black heat absorbing body 64.

In operation, the rays of the sun are directed through lenses 14 onto the surface of the sphere 50, which coincides with the focal points of lenses 14 or expands upon heating to so coincide. As the sphere 50 continues to be heated it will expand beyond the lens focal points until additional cold fluid is introduced into the boiler 52 or some fluid is allowed to escape at which point sphere 50 contracts. This allows for expansion and contraction of the surface of sphere 50 out of the focal point of the lenses to prevent spot burnout of the boiler and permit cheaper materials to be used while making use of the most available heat.

Figure 2:
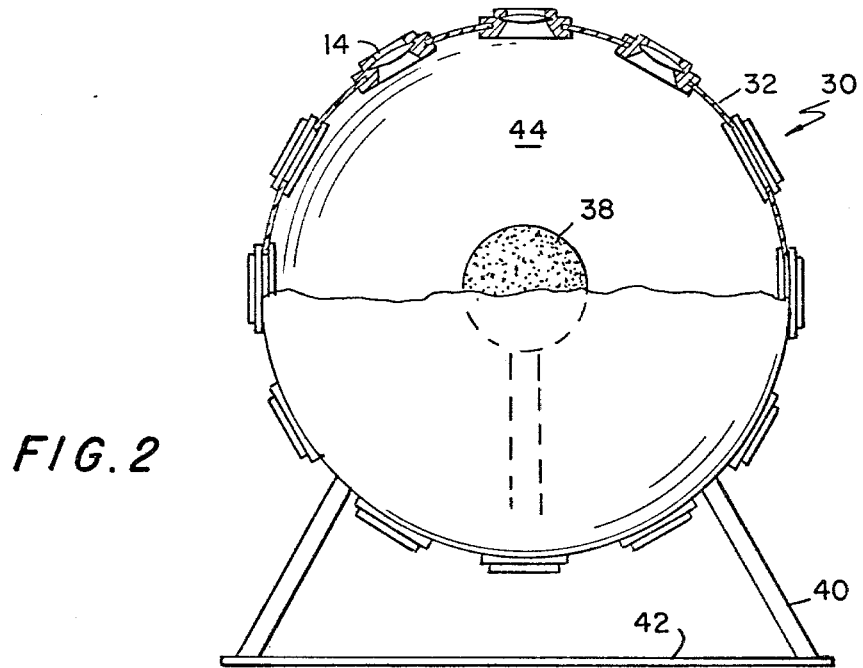
FIG. 2 is view similar to FIG. 1, illustrating another embodiment of the invention wherein the outer body is flexible and the inner member is rigid.

In FIG. 2 there is shown a form 30 of the invention wherein the spherical body 32 is made of a flexible, clear, resilient material having lenses 14 mounted all about its surface and having a fluid heating member 38 therein which may be rigid or similar to the member 18. The sphere is mounted on standards 40 above a reflecting surface 42. The spherical body may be filled with a fluid, such as a suitable liquid or an inert gas 44.

As the interior of body 32 becomes heated, the focal points of lenses 14 move into coincidence with the surface of heating member 18. Further heating causes the focal points to move radially outwardly beyond the member 18. As heated water is extracted from member 18 and cold water introduced into it, the interior of body 32 cools bringing the lens focal points again into coincidence with the surface of heating member 18.

In FIG. 4 there is shown a modified form of the heating member, identified by the reference numeral 18', which may be used within body 12 or separately. The heating member 70 includes an expansible spherical shell 71 having an inlet conduit 76 connected thereto which is provided with a one way inlet valve 78. Discharge conduit 80, provided with a valved pressure gage 82 to serve as a pressure regulator, is connected to the shell 71. A black body 72 supported at 74 is provided within the shell 71 to absorb heat and distribute heat to incoming fluid. Fixed to the expansible shell 71 is a mounting plate 73 carrying a toothed rack 75 which engages a gear 77 for driving a shaft 79. Although rack 75, and hence gear 77, move in two directions as shell 71 expands and contracts, a one-way clutch between gear 77 and shaft 79 can be used to drive the shaft in one direction for performing useful work. In this form of the invention the member 18' can be placed in body 12 or may derive its heat from a mirror, parabolic reflector, or receiver, or the like and may be used to transport, for example, a parabolic mirror. The shaft 79 when rotated can carry the reflector along a solar track. As a cloud cover develops when the shell 71 is contracting a ratchet arrangement could disengage the movement of the reflector. As solar heat redevelops the drive of the shaft 79 would keep the reflector moving. Thus the arrangement could track mirrors and other heat seeking devices. After a predetermined length of time the various devices could be sent back, by spring device or the like, for the start of another solar day.

The periodic movement of shaft 79 could be used to lift a weight which thereafter can be allowed to fall to perform some desired function. Alternatively, shell 71 may be connected to a plunger within a fluid-filled chamber. Upon each expansion of shell 71, the plunger pressurizes the chamber and pushes fluid out of the chamber through a one-way valve. Upon each contraction of shell 71, the plunger moves in the opposite direction and draws additional fluid, from a reservoir, into the chamber through a second one-way valve. The periodic pulses of fluid leaving the chamber can be used to perform some desired work.

As shown in FIG. 5, this solar energy device may be employed for desalinization of water. In this embodiment, the outer body 85 is provided with lenses 87. The body 85 may be transparent and the body and the lenses may be provided on their inner surfaces with a "one way" coating. The resilient heating member 84 is mounted within the body 85 by inlet conduit 86 connected to a source of saline water and by discharge conduit 88. Saline water entering through one way valve 90 will pass into the heating member 84 where the saline water will be in contact with black body 94 supported at 96 within the heating member 84. Heat from the focused sun's rays on the member 84 will turn the saline water to steam and salt. The steam will be at a pressure regulated by pressure gage and valve 100 and will flow into a condenser, shown schematically by condenser plate 102 and thence at 104 to a reservoir for further consumption. The salt can be removed by flushing with fresh water periodically or through use of an access port 106.

In order to enhance heating capabilities a reflector, such as a parabolic reflector 112, may be employed and mounted, for more than one degree of movement about a track 114, on a universal joint 116 controllable by a direct mechanical linkage as heretobefore described with reference to FIG. 4, or by a sun following photoelectric device 118. Thus the reflector can move to assume an optimum position by following the sun.

In the embodiment of the invention shown in FIGS. 6 and 7, outer body 120 includes an elongated rigid element 122, of a suitable metal or plastic, having a V-shaped cross-section. Mounted on the upper edges of element 122 is an elongated lens 124, such as a Fresnel lens, preferably formed of transparent plastic. Body 120 is closed by two end walls 126.

Within body 120 is a member 128, in the form of an elongated tube, preferably having a flat surface 130 facing lens 124. The ends of member 128 are connected by flexible couplings 132, and through holes in end walls 126, to an inlet conduit 134, provided with a one way valve 136, and to a discharge conduit 138 having a valved pressure gage 140.

Tubular member 128 is supported, in the example of FIGS. 6 and 7, by a plurality of bimetallic strips 142 each having an arched configuration. Each strip is designed so that it becomes more arched when heated, so as to move member 128 toward lens 124, and more flattened when cooled, so as to move member 128 away from lens 124.

In use, rays of the sun are focused by lens 124 on to surface 130 of member 128, which coincides with the focal point of the lens or is moved upwardly by bimetallic strips 142 to so coincide. As the water or other liquid in member 128 is heated, the interior of body 120 becomes heated, and strips 142 become more arched, thereby moving member 128 closer to lens 124; hence surface 130 moves upwardly out of the focus of the lens. As heated water is removed from member 128, through conduit 138, and cold water introduced into it, through conduit 134, the temperature of the water in member 128 decreases causing the temperature of the interior of body 120 to decrease. As a result, bimetallic strips 142 become more flattened and member 128 moves downwardly bringing surface 130 into coincidence with the focus of lens 124.

The embodiment of the invention shown in FIG. 8 is very similar to that of FIGS. 6 and 7, and therefore similar parts bear the same reference numerals in all three figures. In FIG. 8, the means for providing relative movement between lens 124 and surface 130 are not bimetallic strips. Instead, a plurality of cylindrical containers 144 are provided, filled with a liquid, such as mercury, which expands with increased temperature and contracts as temperature decreases. A piston 146 floates on the liquid surface in each container 144, the pistons supporting member 128 by means of piston rods 148. As the temperature within member 128, and hence within body 120, rises, the liquid in containers 144 expand thereby lifting pistons 146 and hence member 128 toward lens 124. When the temperature in body 120 decreases, the liquid in containers 144 contracts and member 128 moves downwardly away from lens 124. In this way, surface 130 is moved into and out of coincidence with the focus of lens 124.

In either of the embodiments of FIGS. 6–8, means such as described above with respect to FIG. 4 can be associated with the movement of member 128 to perform useful work.

While the solar energy device has been described in several embodiments herein, it is recognized that variations and changes may be made within the scope of the appended claims. For example, although in FIGS. 1-5 body 12 and member 18 have been shown in spherical form, other shapes can be used. The body and member could have relatively flat rectangular shapes similar to that of a conventional solar water heater used on the roof of a house, the lenses being arranged in a plane parallel to the flat surface of the heating member. Also, although in FIGS. 6-8 bimetallic strips 142 and piston-cylinder devices 144, 146 move member 128, they could be mounted between element 122 and lens 124 so as to move the lens.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:

1. A solar energy device comprising:

a member adapted to contain a liquid, at least one lens spaced from the member for concentrating rays from the sun on a surface of the member;

means for introducing relatively cold liquid into the member and withdrawing liquid at a higher temperature from the member, and means for relatively moving the member surface and lens toward and away from each other in response to changes in temperature of the liquid within the member so as to move said surface of the member into and out of coincidence with the focal point of the lens.

2. A solar energy device as defined in claim 1 wherein said moving means includes an element which expands and contracts in response to temperature variations.

3. A solar energy device as defined in claim 1 wherein said lens remains stationary and said moving means moves said member.

4. A solar energy device as defined in claim 1 wherein said moving means includes a bimetallic strip.

5. A solar energy device as defined in claim 1 wherein said moving means includes a container filled with a liquid which expands and contracts in response to temperature variations.

6. A solar energy device as defined in claim 1 including a body within which said member is located, said moving means being located within said body between said body and said member.

7. A solar energy device as defined in claim 6 wherein said body carries said lens.

8. A solar energy device as defined in claim 1 wherein said moving means includes an expansible and contractible body within which said member is located, said body carrying said lens.

9. A solar energy device as defined in claim 1 wherein at least a portion of said member is expansible and contractible, said portion serving as said moving means.

10. A solar energy device as defined in claim 1 including means for transmitting the relative movement between said member and lens to a work-performing mechanism.

* * * * *